US006049824A

United States Patent [19]
Simonin

[11] Patent Number: 6,049,824
[45] Date of Patent: *Apr. 11, 2000

[54] SYSTEM AND METHOD FOR MODIFYING AN INFORMATION SIGNAL IN A TELECOMMUNICATIONS SYSTEM

[75] Inventor: Stephen Simonin, Northfield, Conn.

[73] Assignee: ADC Telecommunications, Inc., Minnetonka, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/975,735

[22] Filed: Nov. 21, 1997

[51] Int. Cl.⁷ .............................. H04N 7/10; H04H 1/00; H04L 12/28; H04J 3/12
[52] U.S. Cl. .............................. 709/219; 348/9; 455/4.1; 370/258; 370/528
[58] Field of Search ...................... 348/6, 9, 10; 455/3.1, 455/4.1, 6.1, 6.2; 345/326, 327; 370/254, 257, 258, 522, 524, 528; 709/217–219; H04N 7/10

[56] References Cited

U.S. PATENT DOCUMENTS

| | | | |
|---|---|---|---|
| 4,293,948 | 10/1981 | Soderblom | 370/90 |
| 4,553,234 | 11/1985 | Brandsma et al. | 370/86 |
| 4,706,080 | 11/1987 | Sincoskie | 340/825.02 |
| 4,750,171 | 6/1988 | Kedar et al. | 370/85 |
| 4,752,924 | 6/1988 | Darnell et al. | 370/86 |
| 4,757,497 | 7/1988 | Beierle et al. | 370/89 |
| 4,836,317 | 6/1989 | Straussmann et al. | 178/2 R |
| 4,908,824 | 3/1990 | Leibe et al. | 370/85.15 |
| 4,933,937 | 6/1990 | Konishi | 370/85.13 |
| 4,947,390 | 8/1990 | Sheehy | 370/85.13 |
| 5,003,531 | 3/1991 | Farinholt et al. | 370/16.1 |
| 5,086,426 | 2/1992 | Tsukakoshi et al. | 370/85.13 |
| 5,101,405 | 3/1992 | Bekki et al. | 370/85.15 |
| 5,105,188 | 4/1992 | Jung et al. | 340/825.05 |
| 5,179,548 | 1/1993 | Sandesara | 370/16.1 |
| 5,218,603 | 6/1993 | Watanabe | 370/85.13 |
| 5,220,562 | 6/1993 | Takada et al. | 370/85.13 |
| 5,301,185 | 4/1994 | Cherry | 370/16.1 |
| 5,337,309 | 8/1994 | Faulk | 370/60 |

(List continued on next page.)

OTHER PUBLICATIONS

Bucci, G., et al., "Design and performance evaluation of a high throughput Ethernet/FDDI Interconnect", Proceedings Advanced computer Technology, Reliable Systems and Applications; 5th Annual European Computer Conference, Bologna, pp. 89–93, (May 13–16, 1991).

Bucci, G., et al., "Performance Analysis of Two Different Algorithms for Ethernet–FDDI Interconnection", *IEEE Transactions on Parallel and Disbributed Systems*, vol. 5, No. 6, pp. 614–629, (Jun. 1994).

Ohteru, Y., "Interconnecting IEEE 802 LANS by a wideband backbone network", *IEEE*, pp. 130–135, (1987).

*Primary Examiner*—John W. Miller
*Attorney, Agent, or Firm*—Schwegman, Lundberg, Woessner & Kluth, P.A.

[57] ABSTRACT

A method for selectively modifying an information signal at a remote site in a telecommunications system having a head end and a number of remote sites connected to form a ring. An initiation signal is received at a head end. The initiation signal indicates when to start modifying the information signal. Further, the method retrieves at least one stored modification signal. The method also transmits the modification signal to at least one selected remote site over a packet ring network of the telecommunications system. The packet ring network includes ring switches that self-learn the location of network devices based on addresses in packets processed by the switches and which learn that addresses of network devices associated with other ring switches are reachable out of at least one ring port of the ring switch. The information signal is modified with the modification signal. The method also detects the end of the modification signal and ends the modifying of the information signal.

29 Claims, 1 Drawing Sheet

U.S. PATENT DOCUMENTS

| | | | |
|---|---|---|---|
| 5,444,692 | 8/1995 | Basso et al. | 370/13 |
| 5,477,540 | 12/1995 | Yang et al. | 370/85.5 |
| 5,483,536 | 1/1996 | Gunji et al. | 370/85.14 |
| 5,490,252 | 2/1996 | Macera et al. | 395/200.1 |
| 5,495,232 | 2/1996 | Kochem et al. | 340/825.05 |
| 5,581,710 | 12/1996 | Noel et al. | 395/200.21 |
| 5,600,366 | 2/1997 | Schulman | 348/9 |
| 5,610,905 | 3/1997 | Murthy et al. | 370/401 |
| 5,617,421 | 4/1997 | Chin et al. | 370/402 |
| 5,651,000 | 7/1997 | Lee et al. | 370/258 |
| 5,651,003 | 7/1997 | Pearce | 370/395 |
| 5,652,615 | 7/1997 | Bryant et al. | 348/9 |
| 5,657,327 | 8/1997 | Hamada et al. | 370/389 |
| 5,659,543 | 8/1997 | Ater et al. | 370/258 |
| 5,684,800 | 11/1997 | Dobbins et al. | 370/401 |
| 5,822,018 | 10/1998 | Farmer | 348/9 X |
| 5,872,783 | 2/1999 | Chin | 370/392 |
| 5,892,922 | 4/1999 | Lorenz | 395/200.68 |
| 5,909,686 | 6/1999 | Muller et al. | 707/104 |
| 5,920,566 | 7/1999 | Hendel et al. | 370/401 |

6,049,824

SYSTEM AND METHOD FOR MODIFYING AN INFORMATION SIGNAL IN A TELECOMMUNICATIONS SYSTEM

TECHNICAL FIELD OF THE INVENTION

The present invention relates generally to the field of telecommunications and, in particular, to a system and method for modifying an information signal in a telecommunications system.

BACKGROUND OF THE INVENTION

Conventionally, cable television systems transmit audio and video signals for a number of different channels to subscribers from a head end over a network. The cable television system receives audio and video feeds from content providers. Such content providers typically include a number of local channels, e.g, local network affiliates, community access channels, as well as a number of national and premium channels, e.g., Cable Network News (CNN), Entertainment and Sports Programming Network (ESPN), TNT, USA Network, Home Box Office (HBO), Nickelodian. Typically, a cable television system contracts with the content providers for the option to transmit local commercial advertisements on many of these national and premium channels. At the same time that such local advertisements are running, the content providers also transmit national advertisements in their audio/video feed to be broadcast over local systems that do not exercise the option to air local commercials. Thus, the local cable television system typically has equipment that allows the local advertisements to be inserted in place of the national advertisements.

Conventionally, a cable network receives audio and video signals (the "feed") from the content providers at a central site commonly referred to as the "head end" or the "central" or "main" head end. These signals are then transmitted over, for example, a fiber optic transport ring to a number of geographically dispersed sites referred to as "remote" head ends. The signals from the remote head ends are then provided over, for example, coaxial cable to subscriber equipment, e.g., a television in a residence or business.

To allow for insertion of local advertisements, conventional cable systems typically use a server at each remote head end that stores the advertisements in a compressed format, e.g., formats specified by the Motion Pictures Expert Group, known collectively as "MPEG" standards, for broadcast over the cable network when scheduled. Such servers are commercially available from Sea Change International of Maynard, Mass. These servers are expensive to install and contribute a significant cost to the cable television system. Further, the servers are expensive to maintain. Typically, the servers are maintained by a trained technician at each site or an individual who travels between the remote head ends. In either event, the costs associated with operating the server that inserts the local advertisements is significant.

For the reasons stated above, and for other reasons stated below which will become apparent to those skilled in the art upon reading and understanding the present specification, there is a need in the art for a more economical system and method for allowing local modification of an information signal.

SUMMARY OF THE INVENTION

The above mentioned problems with telecommunications systems and other problems are addressed by the present invention and which will be understood by reading and studying the following specification. A system and method for modifying a signal is described which transmits a modification signal to a remote distribution location over a packet network with ring switches that self learn the associations between network devices and ring switches.

In particular, an illustrative embodiment of the present invention includes a method for selectively modifying an information signal at a remote site in a telecommunications system having a head end and a number of remote sites connected to form a ring. An initiation signal is received at a head end. The initiation signal indicates when to start modifying the information signal. Further, the method retrieves at least one stored modification signal. The method also transmits the modification signal to at least one selected remote site over a packet ring network of the telecommunications system. The packet ring network includes ring switches that self-learn the location of network devices based on addresses in packets processed by the switches and which learn that addresses of network devices associated with other ring switches are reachable out of at least one ring port of the ring switch. The information signal is modified with the modification signal. The method also detects the end of the modification signal and ends the modifying of the information signal.

In another embodiment, a telecommunications system is provided. The telecommunications system includes a ring transport system. In the ring transport system, at least one channel is used to transport data packets over a ring including a number of ring switches. The ring switches self-learn the location of network devices based on addresses in packets processed by the ring switches. The ring switches further learn that addresses of network devices associated with other ring switches are reachable out of at least one ring port of the ring switch. The telecommunications system also includes a head end that is coupled to the ring transport system and that is coupled to one of the ring switches. The telecommunications system also includes at least one remote site that is coupled to the ring transport system. Each remote site includes one of the ring switches. The ring transport system includes at least one other channel for transporting an information signal between the head end and the at least one remote site. The head end also includes a signal source that is coupled to transmit modification signals on the at least one channel of the ring transport that transmits data packets. At the remote sites, at least one addressable decoder card is included that decodes the signals from the signal source and that uses the decoded signals to modify the information signal.

In another embodiment, a method for selectively modifying an information signal at a remote site in a telecommunications system having a head end and a number of remote sites connected to form a ring is provided. The method receives, at the head end, an initiation signal that indicates when to start modifying the information signal. Further, at least one stored modification signal is selectively retrieved. The modification signal is transmitted to at least one selected remote site over a packet ring network that supports Ethernet packets. The method modifies the information signal with the modification signal and detects end of the modification signal. The method finally ends the modifying of the information signal.

In another embodiment, a telecommunications system is provided. The telecommunications system includes a ring transport system. In the ring transport system, at least one channel is used to transport Ethernet packets. A head end is coupled to the ring transport system. At least one remote site is also coupled to the ring transport system. The ring transport system includes at least one other channel for transporting an information signal between the head end and the at least one remote site. The head end includes a signal source that is coupled to transmit modification signals on the at least one channel of the ring transport that transmits Ethernet packets. Finally, at the remote sites, at least one addressable decoder card decodes the modification signals from the signal source and uses the decoded signals to modify the information signal.

DETAILED DESCRIPTION

Figure 1:
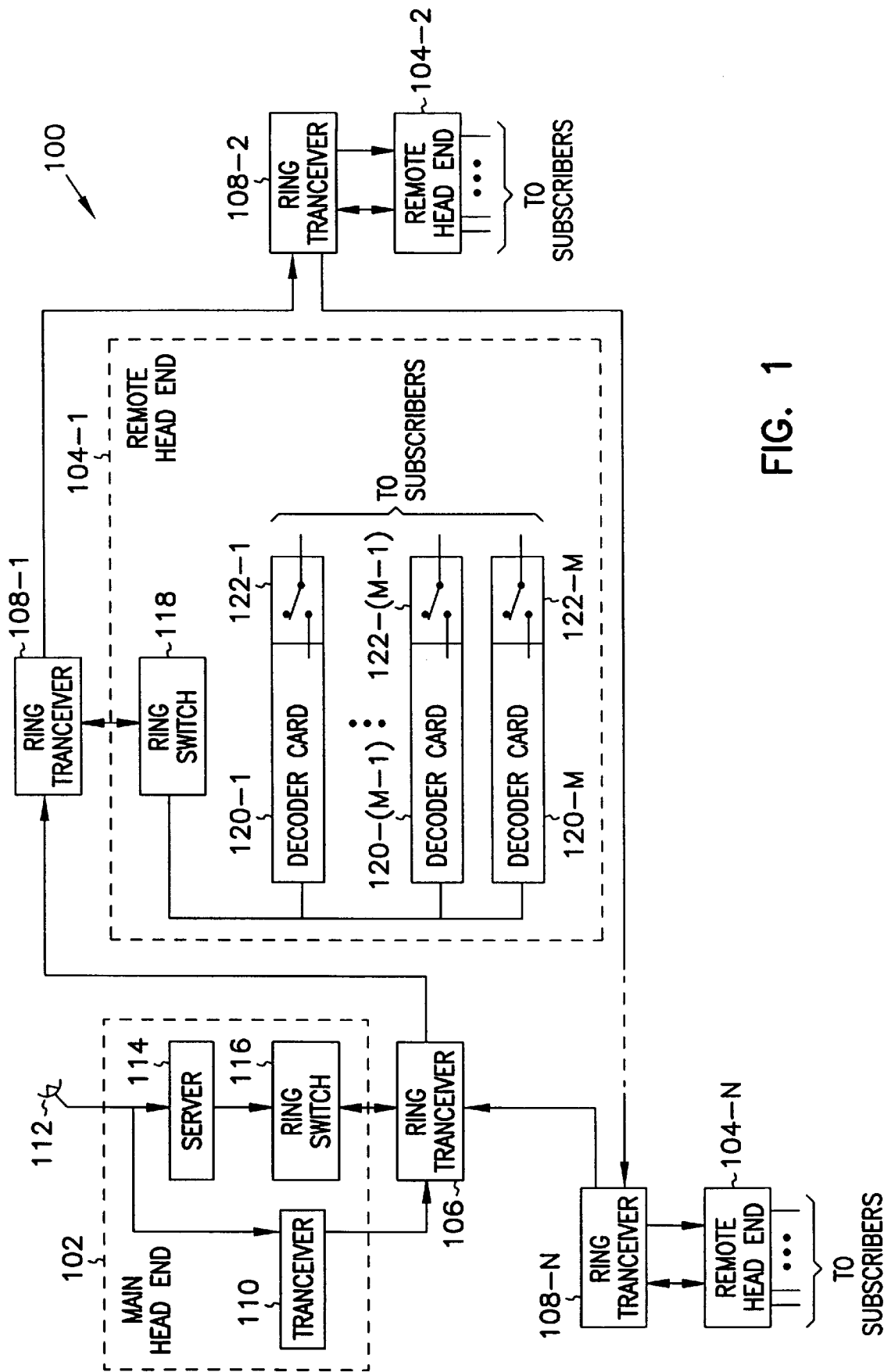
FIG. 1 is a block diagram of a telecommunications system that provides selectable modification of an information signal at a remote site according to the teachings of the present invention.

In the following detailed description, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

FIG. 1 is a block diagram of an illustrative embodiment of a telecommunications system, indicated generally at 100, according to the teachings of the present invention. System 100 includes main head end 102 and a number of remote head ends 104-1 through 104-N that are coupled together in a ring configuration by a ring transport system. For example, in one embodiment, the ring transport system includes ring transceiver 106 that is associated with main head end 102 and a number of additional transceivers 108-1 through 108-N, each associated with one of the remote head ends 104-1 through 104-N, respectively. Ring transceivers 106 and 108-1 through 108-N may comprise, for example, DV6000 fiber optic transceivers commercially available from ADC Telecommunications of Minnetonka, Minn. In other embodiments, ring transceivers 106 and 108-1 through 108-N may be coupled using other conventional communications medium including, by way of example, wireless, wired, or other appropriate communications medium Advantageously, system 100 allows an information signal provided from head end 102 to be selectively modified at one or more of remote head ends 104-1 through 104-N without the use of expensive and sensitive servers at each remote head end. For purposes of this specification, the term "information signal" means audio, video, or data signals, alone or in combination with other signals. For example, in a cable television system, the information signals may comprise audio and video signals of the feed for a cable television channel.

System 100 can be used to allow the operator of a local cable television system selectively to insert local advertisements into the feed from a nationally broadcast channel. This is accomplished by selectively providing modification signals over one of the channels of the transport system in packets that are switched to a selected remote head end using ring switches which learn the location of network devices, e.g., addressable components of a remote head end, based on addresses in packets processed by the switches and which learn that addresses of network devices associated with other ring switches are reachable out of at least one ring port of the ring switch. By using these ring switches, the modification signal can be transported using a conventional packet technology, such as Ethernet, which provides, among other advantages, high data rates, small package sizes, and error detection/correction protocols that allow near real-time error recovery in system 100. In other embodiments, system 100 can be used to modify information signals in a distance learning system, to insert a live feed into a television broadcast or to selectively modify an information signal from a head end in other appropriate telecommunications systems.

Head end 102 includes a number of transceivers 110 that receive information signals from content providers via, e.g., wired, satellite or other wireless feeds at antenna 112. Transceivers 110 transmit the information signals in a number of channels over the transport system to remote head ends 104-1 through 104-N. Further, head end 102 also includes server 114 that stores encoded modification signals, e.g., MPEG signals, for transmission to the remote head ends. Head end 102 is programmable to indicate the time that a particular information signal is to be modified with a particular modification signal. The transmission of a selected modification signal is based on a pulse signal from, for example, a satellite feed. Finally, head end 102 includes ring switch 116 that provides, for example, an "Ethernet" connection between server 114 and ring transceiver 106. In one embodiment, this Ethernet connection uses the 100 BaseT FastEthernet protocol. However, it is understood that other protocols can be used in place of the 100 BaseT protocol. For purposes of this specification, the term "Ethernet" includes the entire class of Carrier Sense Multiple Access/Collision Detection (CSMA/CD) protocols covered by the family of computer industry standards known variously as IEEE-802.3 and ISO 8802/3. This includes but is not limited to 1-megabit Ethernet, known as "StarLAN", 10-megabit Ethernet, 100-Megabit Ethernet, known as "Fast Ethernet", 1-gigabit Ethernet, known as "Gigabit Ethernet" and any future CSMA/CD protocols at any other data rates. Ring switch 116 may comprise a ring switch of the type described in U.S. patent application Ser. No. 08/915,919, (Attorney Docket No. 500.663US1) entitled Circuits and Methods for a Ring Network, filed on Aug. 21, 1997 by Michael H. Coden (the "Coden Application"). The disclosure of the Coden Application is incorporated herein by reference.

Remote head end 104-1 includes ring switch 118. Ring switch 118 is, for example, of the variety described in the Coden Application. Ring switch 118 couples signals between transceiver 108-1 and a number of decoder cards 120-1 through 120-M. In the cable television environment, each decoder card 120-1 through 120-M can be used to modify an information signal for a particular channel. For example, decoder 120-1 could be used to modify the information signal for the channel that carries, e.g., CNN. The number of decoder cards provided at the remote head ends can be varied based on the number of channels that are configured to support selective insertion of local advertisements. Each decoder card 120-1 through 120-M has an associated address that is used to identify which packets should be picked up by the decoder card. Thus, the decoder cards are essentially addressable network devices. Further, a number of decoder cards can be supported by a single data packet channel over the transport system. For example, with the DV6000, a single channel can support a 100 BaseT Ethernet connection. The Ethernet connection can support 10 or more decoder cards.

Remote head end 104-1 also includes switches 122-1 through 122-M. Switches 122-1 through 122-M each receive information signals from head end 102 over the transport system. Further, each switch 122-1 through 122-M has a second input that is coupled to an output of a corresponding decoder card 120-1 through 120-M. Switches 122-1 through 122-M provide output signals that are provided to subscribers of system 100. It is noted that remote head end 104-1 is illustrated and described here by way of example. Remote head ends 104-2 through 104-N are constructed and operate in a similar manner.

In one embodiment decoder cards 120-1 through 120-M include a buffer circuit that is adjustable from, for example, 0 to at least 2 seconds to allow for real time error correction of the modification signal transmitted over the transport system to the remote head end. Typically, the buffer is set for 1/32 of a second (the duration of a typical frame of video) to take advantage of Telecommunication Protocol/Internet Protocol (TCP/IP) error correction. This allows system 100 to retransmit lost packets before they are "seen" by the subscriber thus avoiding "frozen" images that are often encountered when MPEG video is transmitted over a DS3 connection.

In operation, system 100 selectively modifies an information signal transmitted between head end 102 and, for example, remote head end 104-1. The information signal is received at antenna 112 and placed onto the transport system by transceiver 110. Ring transceiver 106 passes the information signal to transceiver 108-1 for transmission by remote head end 104-1 through, for example, switch 122-1 to subscribers of system 100. When a local advertisement or other modification signal is to be provided to the subscriber in place of or in conjunction with the information signal, a pulse is received by antenna 112. The pulse causes server 114 to transmit the selected modification signal through ring switches 116 and 118 to decoder card 120-1. The modification signal is transmitted in packets with an address that indicates the packets are destined for decoder card 120-1. It is noted that the address used could correspond to a group of decoder cards located at a number of remote head ends. Decoder card 120-1 decodes the modification signal down to a base band signal. Upon detecting a base band output from decoder card 120-1, switch 122-1 switches to output the base band signal from decoder card 120-1 in place of the information signal or in conjunction with the information signal when a blanking pulse is detected in the information signal. Switch 122-1 switches back to the information signal when the absence of a base band signal is detected at the output of decoder card 120-1.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, other packet protocols can be used to transmit the modification signal over the transport system to a remote head Further, the remote head ends can include any appropriate number of decoder cards. Further, the modification signal can be compressed using protocols other than MPEG. It is also noted that not all channels processed at a remote head end need to be configured for insertion of local advertisements.

What is claimed is:

1. A method for selectively modifying an information signal at a remote site in a telecommunications system having a head end and a number of remote sites connected to form a ring, the method comprising:

receiving, at the head end, an initiation signal that indicates when to start modifying the information signal;

selectively retrieving at least one stored modification signal;

transmitting the modification signal to at least one selected remote site over a packet ring network that supports Ethernet packets;

switching the Ethernet packets off the packet ring network based on an identifier within the Ethernet packet at the selected remote site;

modifying the information signal with the modification signal;

detecting the end of the modification signal; and ending the modifying of the information signal.

2. The method of claim 1, and further including:

buffering the modification signal at the remote site; and performing error correction at the remote site.

3. The method of claim 1, wherein selectively retrieving at least one stored modification signal comprises selectively retrieving at least one stored signal in an MPEG format.

4. The method of claim 1, wherein transmitting the modification signal to at least one selected remote site comprises transmitting the modification signal to at least one of a number of addressable decoders.

5. The method of claim 1, and further including verifying at the head end that the modification signal was transmitted to the remote site.

6. The method of claim 1, and further comprising detecting a blanking pulse to initiate insertion of the modification signal in place of the information signal.

7. A telecommunications system, comprising:

a ring transport system that includes at least one channel that is used to transport Ethernet packets;

a head end coupled to the ring transport system;

at least one remote site coupled to the ring transport system;

the ring transport system including at least one other channel for transporting an information signal between the head end and the at least one remote site;

the head end including a signal source that is coupled to transmit modification signals on the at least one channel of the ring transport that transmits Ethernet packets; and at the remote sites, switching the Ethernet packet off the ring transport system based on an identifier within the Ethernet packet to at least one addressable decoder card that decodes the modification signals from the signal source and that uses the decoded signals to modify the information signal.

8. The system of claim 7, wherein the ring transport system includes a ring of optical transceivers.

9. The system of claim 7, wherein the head end includes a server that stores compressed information signals.

10. The system of claim 7, wherein the decoder cards each include a buffer that allows the modification signal to be buffered and error corrected prior to decoding.

11. A method for selectively modifying an information signal at a remote site in a telecommunications system having a head end and a number of remote sites connected to form a ring, the method comprising:

receiving, at the head end, an initiation signal that indicates when to start modifying the information signal;

selectively retrieving at least one stored modification signal;

transmitting the modification signal to at least one selected remote site over a packet ring network of the telecommunications system with ring switches that self-learn the location of network devices based on addresses in packets processed by the switches and which learn that addresses of network devices associated with other ring switches are reachable out of at least one ring port of the ring switch;

modifying the information signal with the modification signal;

detecting the end of the modification signal; and ending the modifying of the information signal.

12. The method of claim 11, wherein the step of receiving the initiation signal comprises the step of receiving a pulse signal from a satellite at the head end.

13. The method of claim 11, wherein the step of retrieving the stored modification signal comprises the step of retrieving a compressed video signal.

14. The method of claim 11, wherein the step of retrieving the stored modification signal comprises the step of retrieving a compressed video signal in an MPEG format.

15. The method of claim 11, wherein the step of transmitting the modification signal comprises the step of transmitting Ethernet packets.

16. The method of claim 11, wherein the step of transmitting the modification signal to at least one remote site comprises the step of transmitting the modification signal to at least one of a number of addressable decoders at the remote site.

17. The method of claim 11, wherein the step of modifying the information signal with the modification signal comprises the step of decoding the modification signal and switching the modification signal in place of the information signal.

18. The method of claim 11, and further including the step of verifying at the head end that the modification signal was transmitted to the remote site.

19. The method of claim 11, and further comprising the step of detecting a blanking pulse to initiate insertion of the modification signal in place of the information signal.

20. The method of claim 11, and further comprising the step of buffering the modification signal at the remote site prior to modifying the information signal.

21. A telecommunications system, comprising:

a ring transport system that includes at least one channel that is used to transport data packets over a ring including a number of ring switches wherein the ring switches self-learn the location of network devices based on addresses in packets processed by the ring switches and which learn that addresses of network devices associated with other ring switches are reachable out of at least one ring port of the ring switch;

a head end coupled to the ring transport system and coupled to one of the ring switches;

at least one remote site coupled to the ring transport system, each remote site including one of the ring switches;

the ring transport system including at least one other channel for transporting an information signal between the head end and the at least one remote site;

the head end including a signal source that is coupled to transmit modification signals on the at least one channel of the ring transport that transmits data packets; and at the remote sites, at least one addressable decoder card that decodes the signals from the signal source and that uses the decoded signals to modify the information signal.

22. The telecommunications system of claim 21, wherein the ring transport system comprises a ring of optical transceivers coupled over fiber optic cable to create the ring transport system.

23. The telecommunications system of claim 21, wherein the head end includes a server that stores compressed information signals.

24. The telecommunications system of claim 23, wherein the server comprises a server that stores video signals in an MPEG format.

25. The telecommunications system of claim 21, and further comprising, at remote sites, a switch associated with each decoder card that switches the output of the decoder card in place of the information signal.

26. The telecommunications system of claim 21, and further comprising, at the remote sites, a switch associated with each decoder card that switches the output of the decoder card in place of the information signal based on a blanking pulse in the information signal.

27. The telecommunications system of claim 21, wherein the ring transport system transports the data packets as Ethernet packets.

28. The telecommunications system of claim 21, wherein the decoder cards each include a buffer that allows the modification signal to be buffered prior to decoding.

29. The telecommunications system of claim 21, wherein each decoder card at the remote site is associated with at least one channel of a television system.

* * * * *

UNITED STATES PATENT AND TRADEMARK OFFICE
CERTIFICATE OF CORRECTION

PATENT NO. : 6,049,824
DATED : April 11, 2000
INVENTOR(S) : Stephen Simonin and Michael H. Coden It is certified that error appears in the above-identified patent and that said Letters Patent is hereby corrected as shown below:

<u>Title page,</u>
Item [75], please replace "Inventor: Stephen Simonin, Northfield, Conn." with
-- Inventor: Stephen Simonin, Northfield, Conn. and Michael H. Coden, Riverdale, New York --

Signed and Sealed this

Thirtieth Day of March, 2004

JON W. DUDAS
*Acting Director of the United States Patent and Trademark Office*